Nov. 4, 1969  P. LÖLLMANN  3,476,278
DEVICE FOR UNCORKING CHAMPAGNE OR SUCHLIKE BOTTLES
Filed May 25, 1967  2 Sheets-Sheet 1
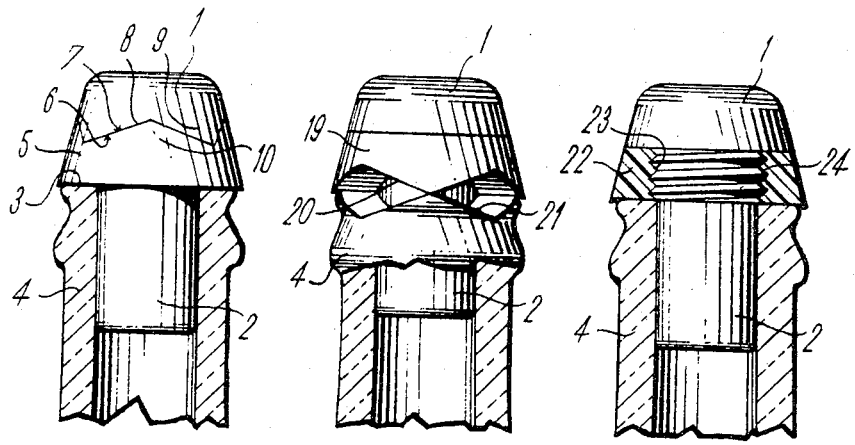
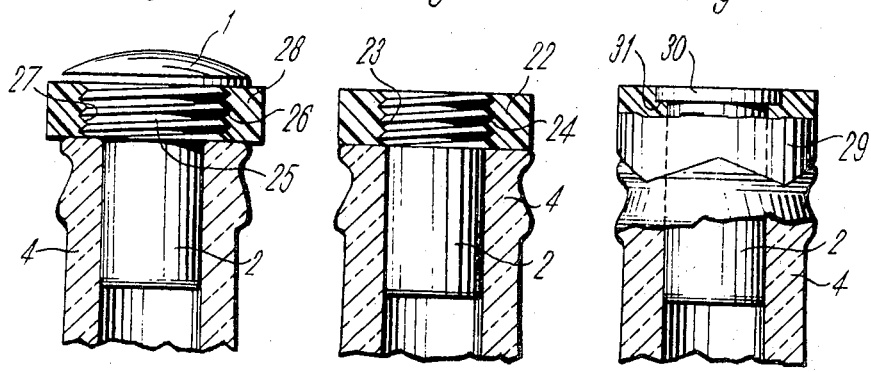
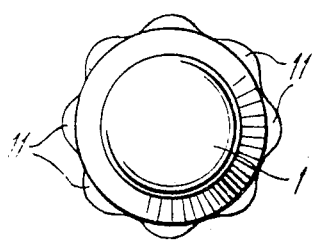
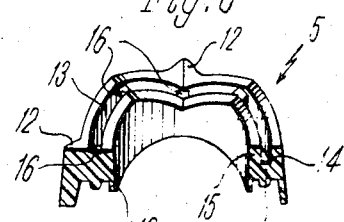
INVENTOR
PAUL LÖLLMANN
BY Dicke & Craig
ATTORNEYS

United States Patent Office 3,476,278
Patented Nov. 4, 1969

3,476,278
DEVICE FOR UNCORKING CHAMPAGNE OR SUCHLIKE BOTTLES
Paul Lollmann, 8 Schwabstrasse, 72 Tuttlingen, Germany
Filed May 25, 1967, Ser. No. 641,208
Claims priority, application Germany, May 31, 1966, L 53,739
Int. Cl. B65d 39/16
U.S. Cl. 215—55
8 Claims

ABSTRACT OF THE DISCLOSURE

A device for facilitating removal of a closure from a bottle, particularly a bottle containing champagne or other matter sealed, under pressure, with a stopper having a shank portion fitting within the bottleneck and a head portion having a diameter greater than that of the shank portion, including a ring member positioned rotatably with respect to the shank portion of the stopper at the end face of the bottle, one surface of the ring member engaging with an adjacent surface of either the bottle or the stopper to cause retraction of the stopper from the bottle upon relative rotation between the ring member and the stopper.

---

This invention relates to a device for uncorking champagne or suchlike bottles plugged with a stopper which has a shank sticking in the bottleneck and a head the diameter of which is greater than the diameter of the shank. Such bottles are usually uncorked by first removing the wired cap fastened to the bottleneck and then attempting to slightly turn the stopper in the bottle and thus raise the stopper. As the shank of the stopper is forced into the bottleneck under high pressure the head of the stopper tends to be torn off the shank and the shank of the stopper sticking in the bottleneck must then be removed by means of some other tool such as a known corkscrew or the like.

It is the object of this invention to provide a device by means of which such champagne bottles can be uncorked in a simple manner. The invention consists in that said device features a ring located on the end face of the bottle and capable of being turned about the shank of the stopper, which ring, when rotated, cooperates with an adjacent part in such a manner as to cause the stopper to be raised. To accomplish this result, in one embodiment of the invention one end face of the ring and a surface resting against it may cooperate with each other, one of the cooperating surfaces, i.e. either the face of the ring or the surface cooperating with it, being provided with inclined planes rising in the direction in which the ring is rotated and the other surface having axially arranged projections which slide on said inclined planes. In this configuration, either the underside of the head of the stopper may operate in conjunction with that face of the ring which it contacts or the bottom end face of the ring may cooperate with the end face of the bottleneck against which it rests. In the latter case the end face of the bottleneck is provided with either projections or inclined planes. In embodiments of the invention the projections are formed by inclined planes arranged in a rooflike pattern.

To uncork the bottle, the ring is rotated with the aid of a tool which can be inserted into recesses on the circumference of said ring, or it may be turned by hand, in which case said ring is provided with means for manipulation extending radially outward. When the ring is rotated, the planes and projections cooperating with each other cause the stopper to be pushed out of the bottleneck a length in the axial direction. The stopper can then easily be gripped and pulled out of the bottleneck entirely, with little effort, by hand.

To obtain a solid outside surface, the cooperating surfaces may have conforming profiles arranged in close contact with each other in such a manner, for instance, that the inclined planes and projections both at the end face of the ring and at the cooperating surface of either the head of the stopper or the end face of the bottle are formed by staggered mating profiles.

In another embodiment of the invention the shank of the stopper or a shoulder at the underside of the head of the stopper is provided with a thread which is engaged by an internal thread of the ring. Here again, rotating the ring causes the stopper to be raised in the bottle. The distance which the stopper can be raised in the bottle is determined by the length of the thread in the shank of the stopper. In the aforementioned embodiments of the invention which merely feature projections sliding along inclined planes the length by which the stopper may be raised in the bottleneck depends upon the inclination and length of the inclined planes.

In those embodiments of the invention where the top end face of the ring cooperates with the bottom end face of the head of the stopper bearing against it the ring is invariably located between the head of the stopper and the end face of the bottle. In those embodiments of the invention where the bottom end face of the ring cooperates with the top end face of the bottleneck and in those embodiments where the internal thread of the ring engages an external thread of the stopper, the head of the stopper may be omitted and formed by the ring which is then so supported as to turn about the shank of the stopper.

In one embodiment of the invention the ring is provided with a sealing lip at the end facing the bottleneck, said sealing lip forming an extension of the inner wall of the ring and sloping diagonally downward and inward. When the ring is slid onto the stopper said sealing lip rests against the outer surface of the shank of the stopper so that in the machines employed for automatically filling and corking the bottles the ring cannot drop from the stoppers and that the ring stays on the shank of the stopper when the latter is removed from the bottle. Apart from this, the diagonal lip is wedged in between the shank of the stopper and the inner rim of the bottle, thus producing an additional sealing effect.

The ring may be made of any material. The invention can be embodied in champagne bottle stoppers consisting entirely of plastic, in champagne bottle stoppers having a cork insert, in champagne bottle stoppers having a head made of plastic and a shank made of natural cork, and in champagne bottle stoppers made entirely of natural cork. It is in the last mentioned type of champagne bottle stoppers that the invention proves particularly useful since the force produced by the rotation of the ring acts mainly in the axial direction, especially in that form of the invention which features threads, so that the cork is evenly stressed in the axial direction.

The profile of the two cooperating surfaces, too, may be fashioned in a great variety of different patterns; for example, the dividing line between the two profiles may be zigzag-shaped, saw-toothed, or fashioned in the form of a wavy line or the like.

In those embodiments of the invention which feature threads, the thread on the shank may be of any suitable form, such as a buttress thread, for instance. It may be remarked that the shank of the stopper does not extend very deep down into the bottle so that a sufficiently long portion of the shank is left to ensure an absolutely tight seal for the contents of the bottle.

Further features of the invention will appear from the following description of embodiments of the invention in conjunction with the claims and the drawing. The various features may be embodied either jointly in one form of the invention or severally.

Various forms in which the invention may be embodied are shown in the accompanying drawing.

FIGS. 1 to 8 are side elevations of such embodiments of the invention.

FIG. 9 is a top view of one embodiment of the invention.

FIG. 10 is a vertical section of one form of the ring.

Figure 7:
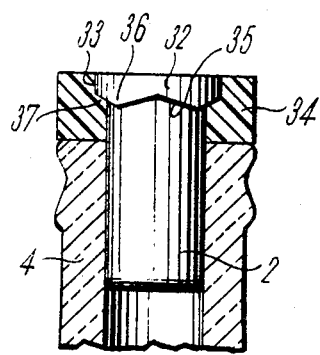

In the embodiment of the invention illustrated in FIG. 1, the champagne bottle stopper consists of a head 1 and a shank 2. Between the head 1 of the stopper and the end face 3 of a bottleneck 4 of a champagne bottle or another bottle with high internal pressure there is located a ring 5. The end face 3 of the bottleneck 4 is plane and as such not novel, while the bottom end face 6 of the head 1 of the stopper and the top end face 7 of the ring 5, which lies against said bottom end face of the head of the stopper, have mating profiles which engage each other as, for instance, profiles with an interface 8 forming a zigzag-line on the circumference of the head 1 of the stopper. The interface 8 may also be saw-toothed or in the form a wavy line, both the ring 5 and the head 1 of the stopper having axially extending projections 9 and 10 formed by inclined planes arranged in a rooflike pattern and sliding along the inclined planes of the opposite surface when the ring 5 is rotated, in a manner that when the ring 5 is rotated the stopper 1, 2 is raised in the bottle by the amount of the height of the projections 9, 10. In order to afford a better grip for rotating the ring 5 said ring is provided with projections 11 (FIG. 9) or 12 (FIG. 10) extending radially outward from its circumference. The axially arranged wires or metal clips of the cap spanning the stopper will then extend through the gaps between said purojections 11 or 12 in case the stopper is additionally secured to the bottleneck by means of such a cap with wires or clips.

In the embodiment of the invention illustrated in FIG. 1, the stopper 1, 2 and the ring 5 are made of plastic. FIG. 10 is a vertical section of the ring 5. The upper portion of the ring 5 is double-walled. The purpose of the hollow space 13 between the two walls 14 and 15 is to save material and to prevent deformations when manufacturing a plastic ring of this kind. The two walls are connected together by webs 16 and the ring-shaped yoke 17 at the bottom end face of the ring 5. As an extension of the inner wall confining the central recess of the ring, the ring 5 is provided with a lip 18 extending diagonally downward and inward. With the ring 5 slid onto the stopper 1, 2, said lip bears against the outer surface of the shank 2 thus preventing the ring from being accidentally dropped from the shank 2 of the stopper.

The ring 5 may also be made of any other suitable material. Similarly, the stopper 1 may consist entirely of natural cork or else the shank 2 of the stopper may be made of natural cork and joined firmly to a plastic head 1 of the stopper by cementing or the like. If the stopper 1, 2 is made of plastic the shank 2 may have a hollow space inside which is filled with an insert of natural cork in a known manner.

FIG. 2 shows an embodiment of the invention in which, when a ring 19 is rotated, instead of adjoining surfaces of the ring and the head 1 of the stopper cooperating to raise the stopper the bottom end face 20 of the ring 19 cooperates with a mating top end face 21 of the bottleneck. Again, the stopper 1, 2 rises when the ring 19 is rotated. In FIG. 2 the embodiment of the invention is shown in the position where the stopper 1, 2 has already been raised by rotation of the ring 19, whereas FIG. 1 illustrates that position where the stopper has not yet been raised by rotating the ring 5. In the position shown in FIG. 2 the raised stopper has been loosened in the bottleneck and can easily be removed by hand.

FIG. 3 shows an embodiment of the invention in which the ring 22 is provided with an internal thread 23 which cooperates with a thread 24 cut into the shank of the stopper. The length of the thread 24 corresponds to the height of the ring 22. When the ring is rotated the stopper 1, 2 is pulled out of the bottleneck 4 in the axial direction. The length by which the stopper 1, 2 can be raised by rotating the ring 22 corresponds to the length of the thread 24. In this embodiment of the invention, the bottom end face of the head 1 of the stopper, the two end faces of the ring 22, and the end face of the bottleneck 4 are plane surfaces.

The embodiment of the invention shown in FIG. 4 differs from the embodiment according to FIG. 3 in that the head 1 of the stopper has an offset shoulder 25 the diameter of which is greater than the diameter of the shank 2 of the stopper and in that the external thread 26 of the head 1 of the stopper, which cooperates with an internal thread 27 of the ring 28, is cut into the outer surface of the offset portion 25. Thus, the thread has a greater diameter than the shank 2 of the stopper.

The embodiment of the invention according to FIG. 5 differs from the embodiment according to FIG. 3 in that the shank 2 of the stopper has no head.

FIG. 6, in turn, differs from the embodiment according to FIG. 2 also in that the head 1 of the stopper is almost completely lacking; in other words, the ring 29 forms the head of the stopper, which in this case is so supported in the shank 2 of the stopper that it can be rotated. To this end, the shank 2 of the stopper, at its upper end, has a headlike enlargement 30 resting flush in a corresponding recess 31 in the top end face of the ring 29.

In the embodiment of the invention shown in FIG. 3, the thread may also be larger than corresponds to the height of the ring 22, thus protruding somewhat into the bottleneck, but not beyond a point where a tight seal would no longer be ensured. The form of the thread may then have the cross-section of a buttress, for instance.

In the embodiment of the invention illustrated in FIG. 7, the shank of the stopper, at its upper end, again features a headlike enlargement with a ring-shaped shoulder 32 lying flush in a conforming recess in the top end face of the ring 34. The bottom end face 35 of the ring-shaped shoulder 32 is provided with projections 36 which are formed by inclined planes arranged in a rooflike pattern and which, when the ring 34 is rotated, slide along mating projections 37 which are again formed by inclined planes arranged at the end face confining the recess 33.

Figure 8:
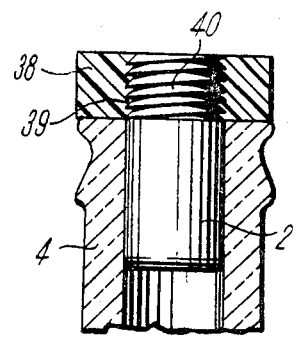

The embodiment of the invention shown in FIG. 8 differs from the embodiment shown in FIG. 3 in that the internal buttress thread 39 is smaller than the outside diameter of the stopper 40 so that when the ring 38 is rotated the internal thread 39 cuts into the stopper, simultaneously causing the stopper to be raised in the bottleneck 4.

Having thus fully described my invention, what I claim as new, and desire to secure by Letters Patent is:

1. A device for facilitating the removal of a closure from a bottle containing matter sealed, under pressure, by a stopper having a shank portion within the bottleneck and a head portion having a diameter larger than that of said shank portion, comprising:

ring means disposed, rotatably with respect to said shank portion of said stopper, adjacent to the end face of a bottle, said ring means including first bearing surface means on at least one lateral face thereof, second bearing surface means engaging with said first bearing surface means, one of said bearing surface means including at least one portion thereof inclined in the direction of rotation, whereby a relative rotation in at least one direction between said ring means and said shank portion of said stopper causes a retraction of said shank portion from said bottleneck, wherein said first bearing surface means are provided on an end face of said ring means, said second bearing surface means being provided on the underside of said head portion of said stopper.

2. A device according to claim 1, wherein said first bearing surface means and said second bearing surface means have complementary profiles providing for intimate engagement therebetween when said stopper is in a sealing position.

3. A device according to claim 1, wherein the internal wall of said ring means is extended obliquely in a downward direction, thus defining a sealing lip for sealing engagement with the bottleneck.

4. A device according to claim 3, wherein said sealing lip is dimensioned to securely engage with said shank portion of said stopper even when said stopper is removed from the bottle.

5. A device according to claim 1, further comprising at least two projections spaced about the periphery of said ring means, said projections serving as means for grasping said ring means and causing rotation thereof relative to said shank portion of said stopper.

6. A devce for facilitating the removal of a closure from a bottle containing matter sealed, under pressure, by a stopper having a shank portion within the bottleneck and a head portion having a diameter larger than that of said shank portion, comprising:
   ring means disposed, rotatably with respect to said shank portion of said stopper, adjacent to the end face of a bottle, said ring means including first bearing surface means on at least one lateral face thereof,
   second bearing surface means engaging with said first bearing surface means, one of said bearing surface means including at least one portion thereof inclined in the direction of rotation, whereby a relative rotation in at least one direction between said ring means and said shank portion of said stopper causes a retraction of said shank portion from said bottleneck, wherein said first bearing surface means are provided on an end face of said ring means, said second bearing surface means being provided on the end face of the bottleneck.

7. A device for facilitating the removal of a closure from a bottle containing matter sealed, under pressure, by a stopper having a shank portion within the bottleneck and a head portion having a diameter larger than that of said shank portion, comprising:
   ring means disposed, rotatably with respect to said shank portion of said stopper, adjacent to the end face of a bottle, said ring means including first bearing surface means on at least one lateral face thereof,
   second bearing surface means engaging with said first bearing surface means, one of said bearing surface means including at least one portion thereof inclined in the direction of rotation, whereby a relative rotation in at least one direction between said ring means and said shank portion of said stopper causes a retraction of said shank portion from said bottleneck, wherein said first bearing surface means are provided on a lateral surface recessed from an end face of said ring means, said head portion of said stopper being dimensioned appropriately to fit within said ring means, said second bearing surface means being provided on the underside of said head portion.

8. A device for facilitating the removal of a closure from a bottle containing matter sealed, under pressure, by a stopper having a shank portion within the bottleneck and a head portion having a diameter larger than that of said shank portion, comprising:
   ring means disposed, rotatably with respect to said shank portion of said stopper, adjacent to the end face of a bottle, said ring means including first bearing surface means on at least one lateral face thereof,
   second bearing surface means engaging with said first bearing surface means, one of said bearing surface means including at least one portion thereof inclined in the direction of rotation, whereby a relative rotation in at least one direction between said ring means and said shank portion of said stopper causes a retraction of said shank portion from said bottleneck, wherein the internal wall of said ring means is extended obliquely in a downward direction, thus defining a sealing lip for sealing engagement with the bottleneck.

References Cited

UNITED STATES PATENTS

| | | | |
|---|---|---|---|
| 1,999,254 | 4/1935 | Pisow | 215—55 |
| 2,476,155 | 7/1949 | McKelvy | 215—55 X |
| 2,801,017 | 7/1957 | Cortat | 215—55 |
| 3,136,458 | 6/1964 | Ruetz | 220—60 X |
| 3,181,719 | 5/1965 | Schaich | 215—46 |
| 3,252,446 | 5/1966 | Bateman | 215—46 X |

FOREIGN PATENTS

| | | |
|---|---|---|
| 16,592 | 10/1889 | Great Britain. |
| 9,792 | 6/1891 | Great Britain. |

DONALD F. NORTON, Primary Examiner

U.S. Cl. X.R.

215—31